March 7, 1967  S. A. NORÉN  3,307,490
DEVICE IN HYDRAULICALLY DRIVEN ENGINES
Filed Feb. 19, 1965
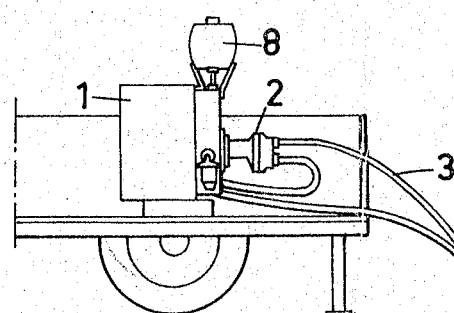
Fig. 1
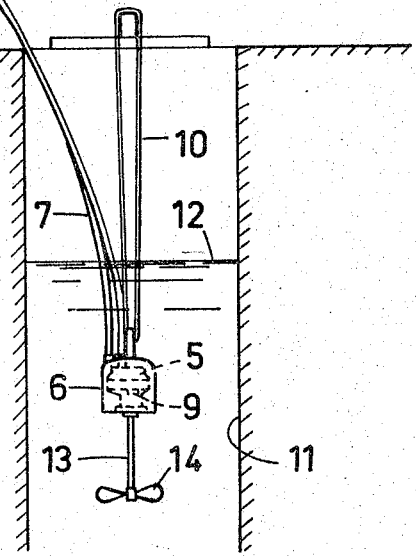
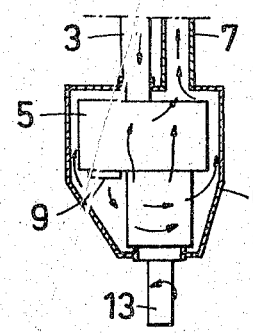
Fig. 2
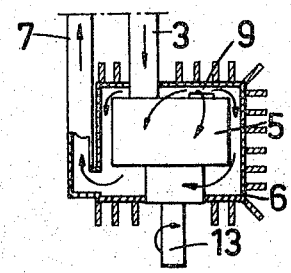
Fig. 3    Fig. 4
INVENTOR
SVEN ANDERS NORÉN
BY
Woodhams, Blanchard & Flynn
ATTORNEYS

United States Patent Office 3,307,490
Patented Mar. 7, 1967

3,307,490
DEVICE IN HYDRAULICALLY DRIVEN
ENGINES
Sven Anders Norén, Bromma, Sweden, assignor to
Stenberg-Flygt Aktiebolag, Solna, Sweden
Filed Feb. 19, 1965, Ser. No. 433,873
4 Claims. (Cl. 103—202)

The present invention relates to a device in hydraulically driven engines. The possibility of using hydraulic engines for driving various machines, especially for various operations in the field or in site, has turned out to be rather limited. The reason for this is often that hydraulic engines, in order to operate safely and economically, require a very accurate manufacture with narrow tolerances and minimum clearances between moving parts. This has required in turn that the minimal clearances are maintained unchanged during operation which is difficult under varying temperature conditions or under conditions when the ambient temperature differs from the temperature of the hydraulic fluid. Such conditions give rise to a non-uniform expansion of the various parts of the engine causing a change in the clearances which may result in the seizure of the rotor. However, should the rotating parts be made with such dimensions that there would never be any risk of seizure, one would get an engine which was uneconomical from the operational point of view and which would have a great leakage past the rotor under normal operation conditions. The above mentioned unfavorable conditions occur in particular engines operating in a liquid medium, such as dredgers, pumps, propellers etc., where the heat transmission between the hydraulic liquid and a metal wall is considerable. Of course the same unfavorable conditions appear if the hydraulic engine is surrounded by a gas having a considerably higher or lower temperature than the hydraulic fluid.

The object of this invention is to eliminate these unfavorable conditions and to provide a device which is substantially independent of the temperature of the surrounding medium.

In order to solve the problem discussed above, a device is provided in accordance with the invention which is characterized by the feature that the hydraulic rotor is enclosed by a liquid-tight casing which forms a part of the circulation passage for the hydraulic driving fluid.

Suitably, the chamber between the rotor and the surrounding liquid-tight casing forms a part of the return passage of the circulation circuit. Thus, the casing will be exposed to a very low hydraulic pressure, and possible changes in temperature of the return oil will not affect the hydraulic engine. If the engine unit is located in an atmosphere having a cooling effect, it may be advisable to utilize the liquid-tight surrounding casing of the invention as an oil cooler, in doing which the outer wall and/or the inner wall of the casing may be provided with cooling fins.

It should be noted that the casing may be provided with several walls, the hydraulic driving fluid then passing either successively in series through the chambers formed between the walls or in parallel through one or more chambers and the outermost chambers may serve as a cooler.

By the hydraulic engine being completely surrounded by the hydraulic fluid the engine may be made of the most suitable material regardless of corrosion problems.

In applying the device to pumps or fans it may be advisable, if the pumped media is a cooling medium, that the outer wall of the liquid-tight casing forms part of the pumping passage or channel.

The various embodiments of the device, according to the invention, will be disclosed hereinafter with reference to the accompanying drawing, wherein FIG. 1 shows a diagrammatic view of a hydraulic driving system. FIGS. 2 and 3 are diagrammatic cross-sections showing some various arrangements for a liquid-tight casing surrounding a hydraulic driving engine. FIGURE 4 is a similar embodiment illustrating the utilization of cooling fins.

In FIG. 1, 1 designates a prime mover which may comprise an electric motor or an internal combustion engine. A hydraulic pump 2 is connected to this prime mover. From the pump 2, a pressure conduit 3 leads to the hydraulic engine 5, which is indicated by broken lines, for driving an agitator 14 or the like. The hydraulic engine 5 is surrounded by a liquid-tight casing 6. The interior of this casing communicates with the outlet 9 from the hydraulic engine 5, and from the casing 6 a return conduit 7 leads to the hydraulic pump 2, possibly by way of an expansion tank 8. The hydraulic engine unit 5–6 is immersed in a well 11 or the like, which is filled with water to the level 12, the unit 5–6 being suspended by a cable 10.

It is assumed that the temperature of the water in the well 11 differs from that of the fluid driving the hydraulic engine 5. For instance, the water may be very much colder than the hydraulic fluid.

In operation, the hydraulic fluid or oil will be forced by the pump 2 through the conduit 3 to the hydraulic engine 5 so that the shaft 13 of the engine is caused to rotate. The oil leaving the hydraulic engine 5 passes out through the outlet nipple 9 into the chamber between the hydraulic engine 5 and the casing 6, after which this oil will flow about the hydraulic engine 5 before it passes out into the return hose 7 to return to the pump 2 via the expansion tank 8. On account of pressure losses in the hydraulic system, the temperature of the oil will always assume a comparatively high value and will in most cases be higher than the ambient temperature. Should the surroundings comprise comparatively cold water, as in the embodiment under consideration, and should the hydraulic engine be in direct contact with the surroundings, the engine would be strongly cooled from the outside resulting in the contraction of the various component parts.

Normal clearances in hydraulic engines having a good operating economy range between 10 and 20 microns so that comparatively small differences in temperature will have a critical effect. For instance, a difference in temperature of no more than 30° C. between the rotor of the hydraulic engine and its casing will cause, in a rotor made of iron and having a diameter of 50 mm., a change of diameter of 18 microns, that is, a reduction in the clearance of 9 microns. Thus, this reduction represents the whole difference in measure permitted.

In this connection a case study is illustrative. In continuous operation the oil often reaches a steady state temperature of about 50° C. If a rotor in this state is stoped, the surrounding cold water will reduce the temperature of the engine to substantially the same temperature as that of the water, which often may be about 5–10° C. When the hydraulic engine is started again, hot oil will thus be pumped through the motor and rapidly heat the rotating parts. Hence, the difference in temperature which is easily attained will, in accordance with the above calculation, unavoidably cause seizing of the rotor in its housing.

These disadvantages will thus be completely eliminated by the device according to the invention because the medium surrounding the hydraulic engine will always have substantially the same temperature as the pressure medium entering the hydraulic engine.

As a matter of course the casing surrounding the hydraulic engine may have various forms depending on how the engine is used in various apparatus. It is also possible to have the casing serving as a cooler for the hydraulic driving fluid.

In FIGS. 2-4 there are shown some further embodiments of a hydraulic driving engine having a surrounding casing in accordance with the invention, corresponding parts being designated by the same reference characters as in FIG. 1. In these figures there are illustrated some different ways of placing the outlet 9 from the hydraulic engine 5 in the casing 6 in relationship to the outlet 7 in the casing itself, in order that the oil circulate over the motor about as completely as possible.

While a number of embodiments of the invention have been shown and described it will be apparent that other embodiments and modifications may be made without departing from the inventive concept or from the scope of the following claims.

The embodiments of the invention in which an exclusive property or privilege is claimed are defined as follows:

1. An apparatus for hydraulic devices exposed to temperatures differing from that of the hydraulic fluid, comprising:
    a hydraulic device having an inlet port and an outlet port;
    a liquid-tight casing forming a chamber enclosing said hydraulic device including said outlet port on said device, said casing having a first opening permitting said inlet port on said device to extend outwardly therefrom and a second opening defining a casing outlet;
    whereby said hydraulic fluid passes through said hydraulic device and exits through said outlet port into said casing, said fluid circulates around the periphery of said device to bring said device to the same temperature as said fluid, said fluid exiting from said casing through said casing outlet.

2. The apparatus defined in claim 1, wherein said chamber enclosing said hydraulic device is constructed so as to conduct said hydraulic fluid in a continuous flow across substantially the whole surface of said hydraulic device.

3. The apparatus defined in claim 1, wherein said chamber constitutes a part of the return passage of said circuit.

4. The apparatus defined in claim 1, wherein said casing is provided with cooling fins.

References Cited by the Examiner
UNITED STATES PATENTS
2,346,372   4/1944   Foottit et al. _____ 103—87

ROBERT M. WALKER, *Primary Examiner.*